US008483110B2

(12) United States Patent
Gao

(10) Patent No.: US 8,483,110 B2
(45) Date of Patent: Jul. 9, 2013

(54) UPLINK TRANSMISSION METHOD, USER EQUIPMENT AND SYSTEM THEREOF

(75) Inventor: Wen Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 13/023,927

(22) Filed: Feb. 9, 2011

(65) Prior Publication Data

US 2011/0141991 A1 Jun. 16, 2011

Related U.S. Application Data

(63) Continuation of application No. PCT/CN2009/072871, filed on Jul. 22, 2009.

(30) Foreign Application Priority Data

Aug. 11, 2008 (CN) .......................... 2008 1 0142356

(51) Int. Cl.
*H04B 7/00* (2006.01)
(52) U.S. Cl.
USPC ........................................................ 370/310
(58) Field of Classification Search
USPC ................. 370/310, 328, 329; 455/403, 422, 455/450–452; 714/748, 749
See application file for complete search history.

(56) References Cited

U.S. PATENT DOCUMENTS

| 8,281,202 | B2 * | 10/2012 | Tseng | 714/748 |
| 8,321,740 | B2 * | 11/2012 | Kuo | 714/748 |
| 8,392,784 | B2 * | 3/2013 | Kuo | 714/749 |
| 2007/0133605 | A1 | 6/2007 | Herrmann | |
| 2008/0049692 | A1 | 2/2008 | Bachu et al. | |
| 2008/0159183 | A1 | 7/2008 | Lindoff et al. | |
| 2008/0301516 | A1 | 12/2008 | Han et al. | |
| 2009/0245225 | A1 * | 10/2009 | Tseng | 370/345 |
| 2009/0257408 | A1 * | 10/2009 | Zhang et al. | 370/336 |
| 2009/0307554 | A1 * | 12/2009 | Marinier et al. | 714/748 |
| 2011/0038352 | A1 * | 2/2011 | Bergman et al. | 370/331 |
| 2011/0141952 | A1 * | 6/2011 | Wang et al. | 370/294 |

FOREIGN PATENT DOCUMENTS

| CN | 101009538 A | 8/2007 |
| CN | 101132264 A | 2/2008 |

OTHER PUBLICATIONS

Chinese Office Action and partial translation received in Chinese Patent Application No. 200810142356.3, mailed May 10, 2012, 8 pages.

Written Opinion of the International Searching Authority and translation received in Patent Cooperation Treaty Application No. PCT/CN2009/072871, mailed Oct. 29, 2009, 7 pages.

Second Chinese Office Action received in Chinese Application No. 2008101142356.3, mailed Sep. 28, 2012, 9 pages. (Partial Translation).

(Continued)

*Primary Examiner* — Dmitry H Levitan

(74) *Attorney, Agent, or Firm* — Slater & Matsil, L.L.P.

(57) ABSTRACT

An uplink transmission method includes acquiring, by a user equipment, a maximum number of hybrid automatic repeat request transmission (M-Tmax). The M-Tmax is an integral multiple of a transmission time interval bundle size. The user equipment performs uplink transmission according to the M-Tmax after a TTI bundle activation time.

20 Claims, 6 Drawing Sheets

OTHER PUBLICATIONS

International Search Report, PCT/CN2009/072871, date of mailing Oct. 29, 2009, 4 pages.

3GPP TS 36.321 V8.2.0 (May-2008), "3$^{rd}$ Generation Partnership Project; Technical Specification Group Radio Access Network; Evolved Universal Terrestrial Radio Access (E-UTRA) Medium Access Control (MAC) protocol specification (Release 8)," May 2008, 33 pages.

3GPP TSG-RAN WG2 Meeting #62bis, "Report of E-UTRA user plane session," Source: Vice Chairman, Agenda Item: 7.1, Tdoc R2-08xxxx, Jun. 30-Jul. 4, 2008, Warsaw, Poland, 25 pages.

3GPP TSG-RAN WG2 Meeting #62bis, "Bundling Issues," Source: Nokia Corporation, Nokia Siemens Networks, Agenda Item: 6.1.1.2, R2-083107, Jun. 30-Jul. 4, 2008, Warsaw, Poland, 5 pages.

ZTE, "TTI Bunding impact on DRX Inactivity Timer," 3GPP TSG-RAN WG2 #62, R2-082253, Agenda Item: 5.1.1.9, May 5-9, 2008, 2 pages, Kansas City, USA.

Samsung, "Uplink Bundling: "Bundle" and Feedback," 3GPP TSG-RAN2 Meeting #62-bis, R2-083480, Agenda Item: 6.1.1.2, Jun. 30-Jul. 4, 2008, Warsaw, Poland.

Rejection Decision of Chinese Application No. 200810142356.3 mailed Apr. 11, 2013, with partial English Translation, 9 pages.

* cited by examiner

US 8,483,110 B2

UPLINK TRANSMISSION METHOD, USER EQUIPMENT AND SYSTEM THEREOF

This application is a continuation of co-pending International Application No. PCT/CN2009/072871, filed Jul. 22, 2009, which designated the United States and was not published in English, and which claims priority to Chinese Application No. 200810142356.3, filed Aug. 11, 2008, both of which applications are incorporated herein by reference.

TECHNICAL FIELD

The present invention relates to the mobile communication field, and more particularly, to uplink transmission methods, user equipment and systems thereof in a communication system.

BACKGROUND

In existing long term evolution (LTE) systems, the same maximum number of hybrid automatic repeat request (HARQ) transmission are used by various services; i.e., when the number of HARQ transmission reaches the maximum number of HARQ transmission, retransmission is stopped. In an LTE system, parallel HARQ processes are used to perform radio link transmission; i.e., after transmission is completed in one process, it is unnecessary to wait for feedback for this process before a next process is used to transmit other data. In a frequency division duplex (FDD) mode, eight HARQ processes in total are used in the LTE system, and a transmission time slot corresponding to each process is one transmission time interval (TTI).

In the LTE system, a TTI bundling mode could be used by a user at an edge of a cell to perform the uplink transmission; i.e., same data is transmitted simultaneously in a plurality of continuous TTIs so that the transmission gain is increased. The plurality of TTIs for continuous transmission is referred to as a TTI bundle, and the amount of the TTIs for continuous transmission is referred to as a TTI bundle size. The same data transmitted simultaneously is actually a plurality of versions of a same data (i.e., a plurality of data blocks with different correction capabilities generated by a same data after being encoded). When the TTI bundling mode is used, TTIs in a same TTI bundle correspond to a same HARQ process for transmission, and four HARQ processes in total could be used in the existing LTE system.

During implementation of the present invention, the present inventor finds that when the mode used by a user equipment (UE) is switched from a normal mode (i.e., a non-TTI bundling mode) to a TTI bundling mode, the existing uplink transmission method is prone to causing errors in transmission, which decreases the transmission quality.

SUMMARY OF THE INVENTION

Uplink transmission methods and systems according to embodiments of the present invention can solve the technical problem that a reduced transmission quality is caused when the mode used by a UE is switched from a normal mode to a TTI bundling mode.

An uplink transmission method according to an embodiment of the present invention includes acquiring, by a UE, a maximum number of HARQ transmission (M-Tmax), wherein the M-Tmax is an integral multiple of a TTI bundle size; and performing, by the UE, uplink transmission according to the M-Tmax after a TTI bundle activation time.

Another uplink transmission method according to an embodiment of the present invention includes initializing a HARQ process by a UE at a TTI bundle activation time or a TTI bundle cancellation time; and performing, by the UE, uplink transmission using the initialized HARQ process.

An uplink transmission system according to an embodiment of the present invention includes a UE and a base station (eNB). The UE is configured to acquire a maximum number of HARQ transmission (M-Tmax), wherein the M-Tmax is an integral multiple of a TTI bundle size. The UE is also configured to perform uplink transmission according to the M-Tmax after a TTI bundle activation time.

Another uplink transmission system according to an embodiment of the present invention includes a UE and an eNB. The UE is configured to, initialize a HARQ process at a TTI bundle activation time, and perform uplink transmission using the initialized HARQ process.

A third uplink transmission system according to an embodiment of the present invention includes a UE and an eNB. The UE is configured to acquire a maximum number of HARQ transmission (M-Tmax), wherein the M-Tmax is an integral multiple of a TTI bundle size, to initialize a HARQ process at a TTI bundle activation time, and to perform uplink transmission using the initialized HARQ process. The maximum number of HARQ transmission of the uplink transmission is the M-Tmax.

In the embodiments of the present invention, at the TTI bundle activation time, the UE reconfigures the maximum number of HARQ transmission and/or initializes the HARQ process so as to increase the transmission quality and the resource utilization rate.

DETAILED DESCRIPTION OF ILLUSTRATIVE EMBODIMENTS

In the following description, technical solutions according to embodiments of the present invention will be described clearly and completely with reference to the accompanying drawings. Obviously, the embodiments described herein represent only some but not all of embodiments of the present invention. All other embodiments that can be obtained by those of ordinary skill in the art based on the embodiments of the present invention and without inventive efforts shall still fall within the scope of the present invention.

Take an existing LTE system as an example. Assuming a maximum number of HARQ transmission when a UE and an eNB in a normal mode perform uplink HARQ transmission is 7. When the UE learns that transmission of a data X fails, and a TTI bundle activation time arrives, i.e., the UE is required to transmit a same data in four TTIs of one TTI bundle after the TTI bundle activation time, the UE uses two TTI bundles, i.e., eight TTIs in total, to perform the uplink transmission. Therefore, the last TTI in the second TTI bundle will not be used in the uplink transmission. In the LTE system, the eNB provides feedback according to the last TTI of each TTI bundle, and the UE receives the feedback according to the TTI used to retransmit the data for the last time (i.e., the seventh TTI in the eight TTIs). Consequently, the UE might fail to receive the feedback message from the eNB correctly, and transmission of the data X is falsely determined as failure, thereby reducing the transmission quality.

In the following description, how to solve the problem that a reduced transmission quality is caused by mismatch between the maximum number of HARQ transmission of the UE in the TTI bundling mode and the TTI bundle size in embodiments of the present invention will be described in detail.

Figure 1:
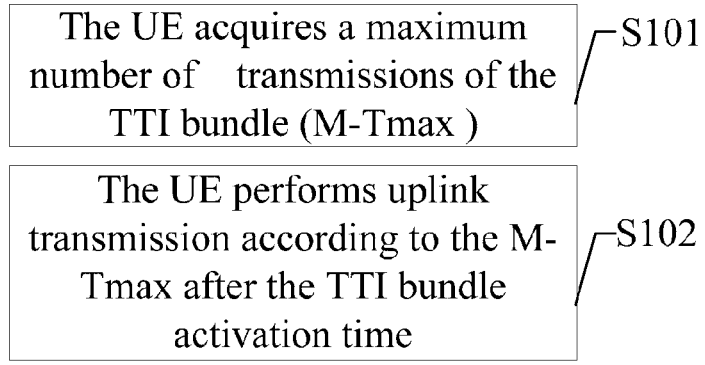
FIG. 1 is a flowchart of an uplink transmission method according to a first embodiment of the present invention.

As shown in FIG. 1, a flowchart of an uplink transmission method according to a first embodiment of the present invention is shown therein.

S101: The UE acquires a maximum number of HARQ transmission (M-Tmax), wherein the M-Tmax is an integral multiple of the TTI bundle size.

In this step, the M-Tmax is the maximum number of HARQ transmission used in uplink HARQ transmission by the UE in the TTI bundling mode. The UE may acquire the M-Tmax according to a presetting way or an appointment with the eNB. The UE may acquire the M-Tmax by reading a newly added parameter of the maximum number of HARQ transmission for a TTI bundling mode in a radio resource control protocol (RRC) signaling, or by reading a parameter of a normal maximum number of HARQ transmission when no new parameter is added in the RRC signaling.

S102: After a TTI bundle activation time, the UE performs uplink transmission according to the M-Tmax.

Specifically, the UE reconfigures the originally configured maximum number of HARQ transmission according to the acquired M-Tmax and performs subsequent uplink transmission, wherein the maximum number of HARQ transmission of the uplink transmission is the M-Tmax.

Further, after a TTI bundle cancellation time, the UE performs uplink transmission according to a normal maximum number of HARQ transmission (M-max). The M-max value may be equal to the maximum number of HARQ transmission (M-max0) used by the UE before the TTI bundle activation time.

Figure 2:
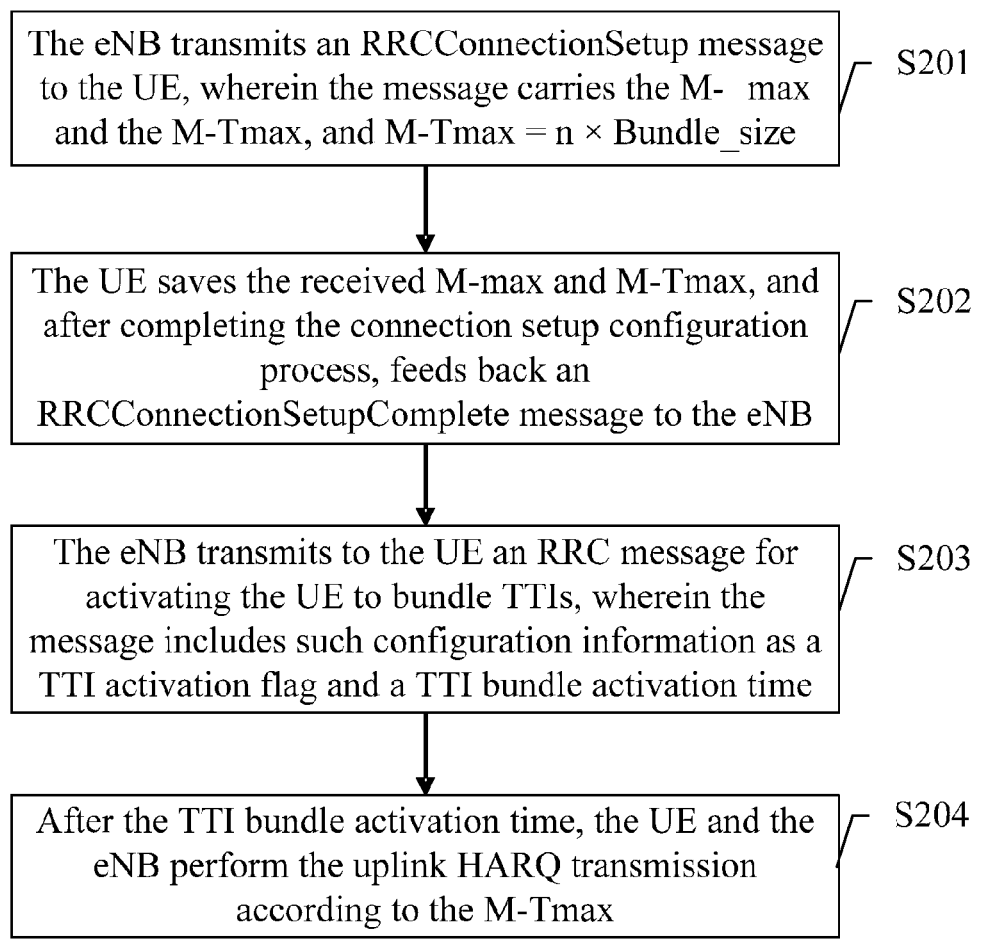
FIG. 2 is a flowchart of an uplink transmission method according to a second embodiment of the present invention.

As shown in FIG. 2, a flowchart of an uplink transmission method according to a second embodiment of the present invention is shown therein. The method according to the second embodiment includes the following steps.

S201: The eNB transmits an RRCConnectionSetup message to the UE, wherein the message carries parameters configured for the UE, including the normal maximum number of HARQ transmission (M-max) which is assumed to be 5 and the maximum number of HARQ transmission for the TTI bundling mode (M-Tmax). The M-Tmax is an integral multiple of the TTI bundle size Bundle_size; i.e., M-Tmax=n× Bundle_size (n is a positive integer). For example, if the Bundle_size is 4, then the M-Tmax configured by the eNB for the UE may be such values as 4, 8, 12 and the like. In this embodiment, the value of the M-Tmax is assumed to be 8.

S202: The UE saves the received M-max and M-Tmax, and after completing the connection setup configuration process, feeds back an RRCConnectionSetupComplete message to the eNB.

S203: The eNB transmits to the UE an RRC message for activating the UE to bundle TTIs. The message includes such configuration information as a TTI activation flag, a TTI bundle activation time and the like, and may further include static scheduling resource information configured for the UE. The TTI bundle activation time may be represented as a radio frame No. and a subframe No.

Correspondingly, the UE can learn when to activate the TTI bundling according to the received RRC message.

S204: After the TTI bundle activation time, the UE and the eNB perform the uplink HARQ transmission according to the M-Tmax.

For example, if the TTI bundle activation time is time T1, the UE and the eNB use M-max=5 to perform the uplink HARQ transmission during communication before the time T1, and start to use M-Tmax=8 to perform the uplink HARQ transmission during communication from the time T1.

Figure 3:
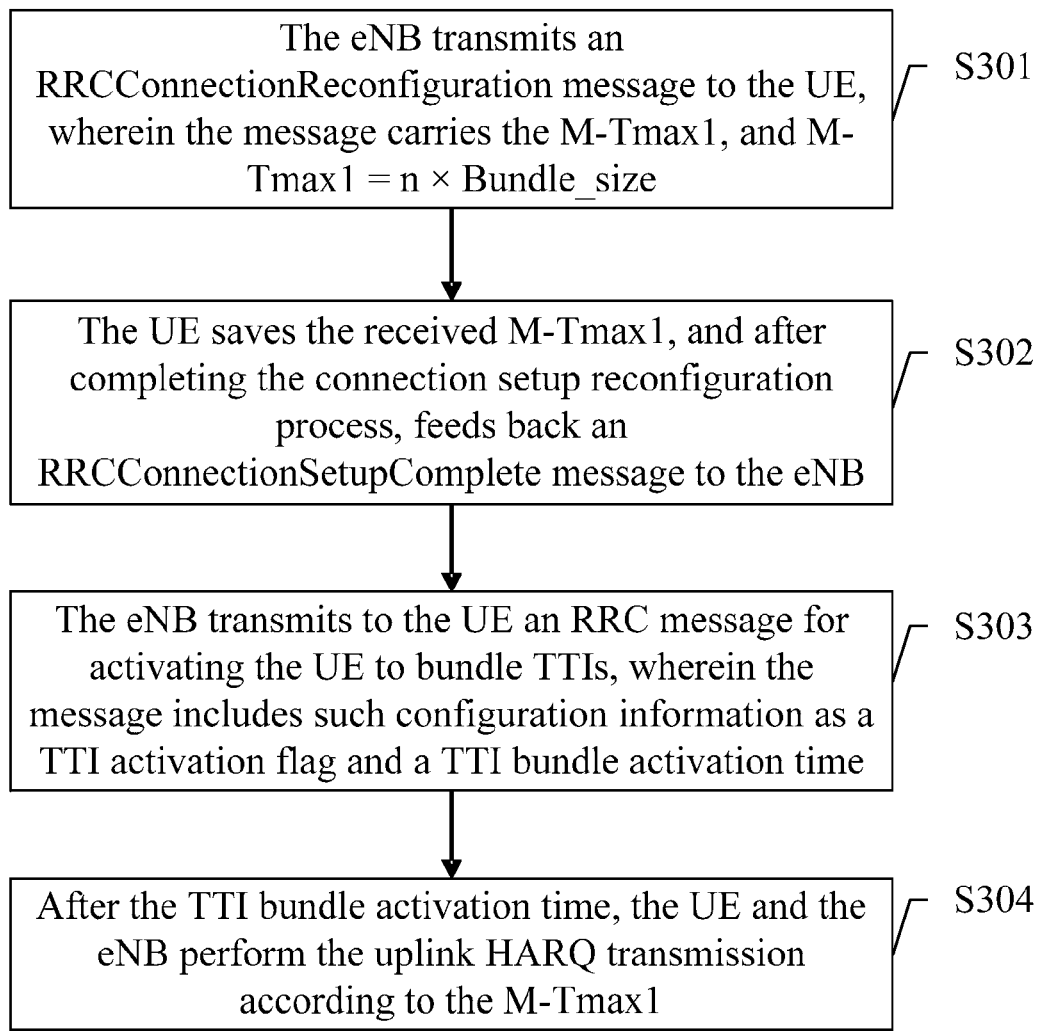
FIG. 3 is a flowchart of an uplink transmission method according to a third embodiment of the present invention.

As shown in FIG. 3, a flowchart of an uplink transmission method according to a third embodiment of the present invention is shown therein. The UE and the eNB use the normal maximum number of HARQ transmission (M-max0) to perform transmission. The method according to this embodiment includes the following steps.

S301: The eNB transmits an RRCConnectionReconfiguration message to the UE, wherein the message carries the maximum number of HARQ transmission for the TTI bundling mode (M-Tmax1) configured for the UE. The M-Tmax1 is an integral multiple of the TTI bundle size Bundle_size; i.e., M-Tmax1=n×Bundle_size (n is a positive integer). For example, if the Bundle_size is 4, the M-Tmax1 configured by the eNB for the UE may be such values as 4, 8, 12 and the like. In this embodiment, the value of the M-Tmax1 is assumed to be 8.

It shall be noted that M-Tmax1 information carried by the RRCConnectionReconfiguration message may be newly added parameter information, and is provided to the UE by means of a reservation field or a newly added field of the message. Alternatively, with no parameter or field being newly added, the M-Tmax1 information may be provided to the UE by means of a field that is used to transmit the normal maximum number of HARQ transmission. Thus, when receiving the normal maximum number of HARQ transmission, the UE will take it as the maximum number of HARQ transmission for the TTI bundling mode (M-Tmax1). In this case, the maximum number of HARQ transmission for the TTI bundling mode is represented by the same parameter (or field) as the normal maximum number of HARQ transmission.

S302: The UE saves the received M-Tmax1, and after completing the connection setup reconfiguration process, feeds back an RRCConnectionSetupComplete message to the eNB.

S303-304: The steps S303-304 are similar to the steps S203-204 in the second embodiment, and thus will not be further described herein.

Further, the RRCConnectionReconfiguration message in the step S301 may further include information of the normal maximum number of HARQ transmission. The eNB transmits a newest value M-max1 of the normal maximum number of HARQ transmission to the UE through this information, and the UE performs subsequent HARQ transmission with the eNB according to the M-max1 until the TTI bundle activation time or until the time receiving a next updated value M-max2 of the normal maximum number of HARQ transmission.

Further, if the UE has received information of the maximum number of HARQ transmission for the TTI bundling mode (M-Tmax0) before the step S302, the UE saves the M-Tmax1 received in the step S302 as an updated value of the M-Tmax0. Optionally, the UE deletes the M-Tmax0 or maintains saving the M-Tmax0. In the step S304, the UE uses the M-Tmax1 to perform uplink transmission after the TTI bundle activation time.

Figure 4:
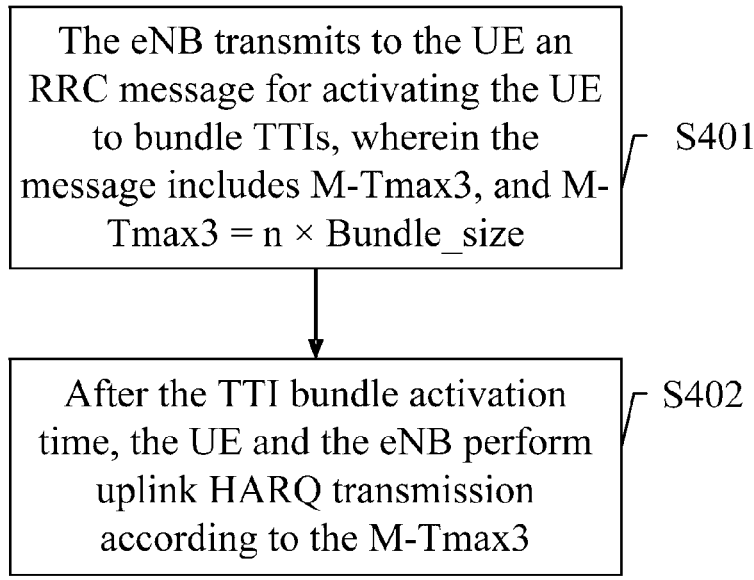
FIG. 4 is a flowchart of an uplink transmission method according to a fourth embodiment of the present invention.

As shown in FIG. 4, a flowchart of an uplink transmission method according to a fourth embodiment of the present invention is shown therein. The UE and the eNB use the normal maximum number of HARQ transmission to perform transmission. The method according to this embodiment includes the following steps:

S401: The eNB transmits to the UE an RRC message for activating the UE to bundle TTIs (i.e., a TTI bundle activation message). The message includes information of the maximum number of HARQ transmission for the TTI bundling mode and such configuration information as a TTI activation flag, a TTI bundle activation time and the like, and may further include static scheduling resource information configured for the UE. The maximum number of HARQ transmission for the TTI bundling mode (M-Tmax3) is an integral multiple of the TTI bundle size Bundle_size; i.e., M-Tmax3=n×Bundle_size (n is a positive integer). The TTI bundle activation time may be represented as a radio frame No. and a subframe No.

Correspondingly, the UE can learn when to activate the TTI bundling according to the received RRC message.

S402: After the TTI bundle activation time, the UE and the eNB perform uplink HARQ transmission according to the M-Tmax3.

In the aforesaid embodiments, when setting up a connection with the UE, or performing the RRC connection setup reconfiguration, or transmitting the RRC message for activating the UE to bundle TTIs, the eNB provides to the UE the information of the maximum number of HARQ transmission for the TTI bundling mode configured for the UE. At the TTI bundle activation time, the UE performs the uplink HARQ transmission with the eNB according to the maximum number of HARQ transmission for the TTI bundling mode. This can decrease an error rate of the UE and the eNB during the process of switching from the normal HARQ transmission to the TTI bundle HARQ transmission, thus increasing the communication quality, avoiding waste of resources, increasing the utilization rate of channel resources, and reducing potential resource conflicts. Further, according to the third embodiment and the fourth embodiment of the present invention, the eNB and the UE can flexibly adjust the maximum number of HARQ transmission for the TTI bundling mode according to actual communication conditions so as to improve the transmission quality more effectively.

To ensure that the maximum number of HARQ transmission for the TTI bundling mode acquired by the eNB and the UE is the most exact value at present, the methods according to the aforesaid second to fourth embodiments can be combined arbitrarily to form a new technical solution. Thus, at the TTI bundle activation time, the UE and the eNB both perform HARQ transmission according to the most newly acquired maximum number of HARQ transmission for the TTI bundling mode.

Figure 5:
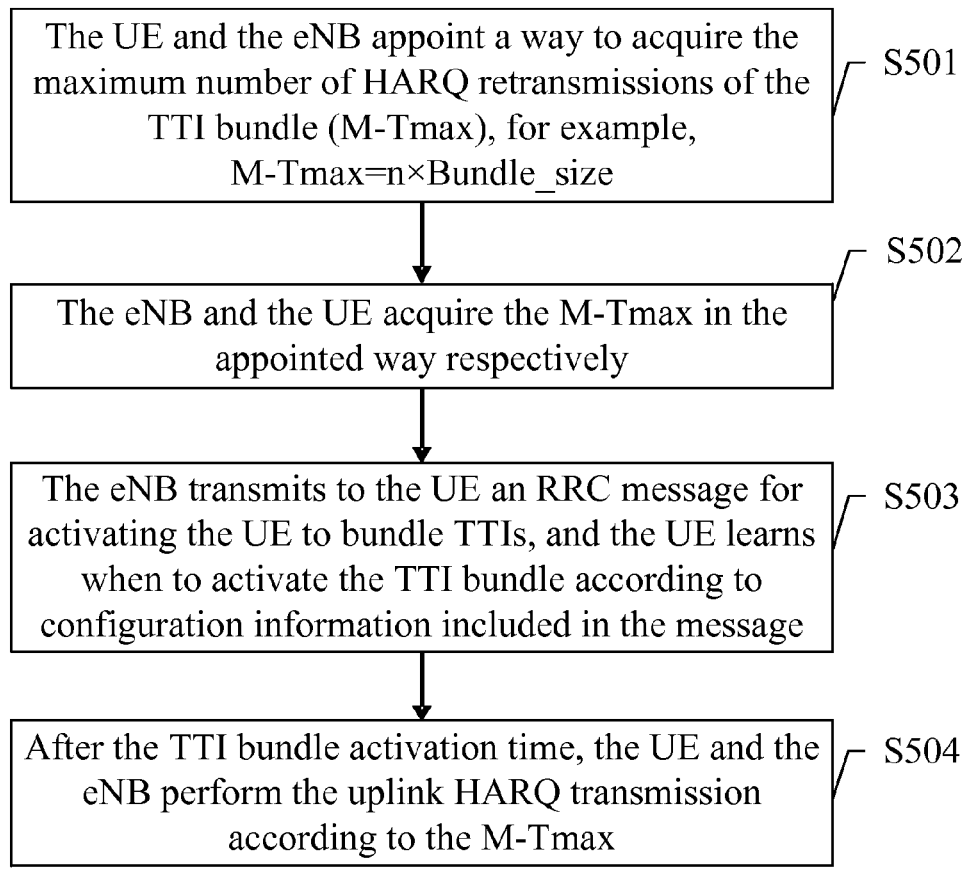
FIG. 5 is a flowchart of an uplink transmission method according to a fifth embodiment of the present invention.

As shown in FIG. 5, a flowchart of an uplink transmission method according to a fifth embodiment of the present invention is shown therein. The UE and the eNB use the normal maximum number of HARQ transmission (M-max0) to perform transmission. The method according to this embodiment includes the following steps.

S501: The UE and the eNB appoint a way to acquire the maximum number of HARQ transmission for the TTI bundling mode (M-Tmax).

Specifically, the UE and the eNB may determine how to acquire the M-Tmax through negotiation, or the eNB may determine a way of acquiring the M-Tmax for the UE and provide the way to the UE, or the UE and the eNB may determine how to acquire the M-Tmax using an appointed computational formula.

In one example, the computational formula used by the UE and the eNB may take the TTI bundle size Bundle_size as a parameter, e.g. M-Tmax=n×Bundle_size (n is a positive integer). In another example, the computational formula used by the UE and the eNB may take the current normal maximum number of HARQ transmission (M-max0) and the Bundle_size as parameters, e.g. M-Tmax=$\lfloor$(M−max0÷2)$\rfloor$×Bundle_size or M-Tmax=$\rceil$(M−max0÷2)$\lceil$×Bundle_size, where $\lfloor$ $\rfloor$ represents rounding down and $\rceil$ $\lceil$ represents rounding up.

S502: The eNB and the UE acquire the M-Tmax according to the appointed way of acquiring the M-Tmax respectively.

S503: The eNB transmits to the UE an RRC message for activating the UE to bundle TTIs; from such configuration information as a TTI activation flag, a TTI bundle activation time and the like included in the message, the UE learns when to activate the TTI bundling.

S504: After the TTI bundle activation time, the UE and the eNB perform the uplink HARQ transmission according to the M-Tmax.

It shall be noted that, it is unnecessary for the eNB and the UE to acquire the M-Tmax simultaneously in the step S502, and the execution order of the step S502 and the step S503 may also be altered. For example, the UE acquires the M-Tmax in the step S502, and the eNB acquires the M-Tmax in the step S503. Besides, one or both of the eNB and the UE may acquire the M-Tmax at the TTI bundle activation time and perform HARQ transmission according to the M-Tmax.

An alternative solution of this embodiment includes the following steps.

S501': The UE and the eNB appoint a specific value of the M-Tmax, wherein the M-Tmax is an integral multiple of the TTI bundle size Bundle_size.

S502': After the TTI bundle activation time, the UE and the eNB perform the uplink HARQ transmission according to the M-Tmax.

In the aforesaid fifth embodiment and the alternative solution thereof, the eNB and the UE acquire the information of the maximum number of HARQ transmission for the TTI bundling mode according to an appointment. After the TTI bundle activation time, the UE performs the uplink HARQ transmission with the eNB according to the maximum number of HARQ transmission for the TTI bundling mode so as to decrease an error rate of the UE and the eNB during process of switching from the normal HARQ transmission to the TTI bundle HARQ transmission and increase the communication quality. Besides, this can avoid waste of resources to increase the utilization rate of channel resources and reduce potential resource conflicts.

The aforesaid first to fifth embodiments provide a plurality of uplink transmission methods. When the uplink transmission between the UE and the eNB is switched from the normal mode (the non-TTI bundling mode) to the TTI bundling mode, the UE and the eNB use the maximum number of HARQ transmission for the TTI bundling mode (M-Tmax) to perform the uplink HARQ transmission. Further, when the uplink transmission between the UE and the eNB is switched from the TTI bundling mode to the normal mode (i.e., the TTI bundling is canceled), the UE and the eNB may take a value of the M-Tmax as the normal maximum number of HARQ transmission to perform the uplink HARQ transmission, or use the normal maximum number of HARQ transmission before bundling the TTIs to perform the uplink HARQ transmission. Therefore, an over-large air interface transmission delay caused by an unsuitable maximum number of HARQ transmission can be avoided to meet requirement on quality of service (QoS) and increase the transmission quality and the resource utilization rate.

In the existing LTE system, the UE in the normal mode uses eight processes to perform uplink transmission, and after the TTI bundle activation time, the UE in the TTI bundling mode uses four processes to perform uplink transmission. If the processes for the UE to perform the uplink transmission are changed, but the UE still performs the transmission using the processing way in the normal mode, the consistency between the UE and the eNB regarding new data indicator (NDI) state information for the same HARQ process cannot be ensured so that errors easily occur during the transmission to reduce the transmission quality. In the following description, how to solve the problem that the UE in the TTI bundling mode still continues the HARQ processes that are performed in the normal mode to cause a reduced transmission quality will be explained in detail.

Figure 6:
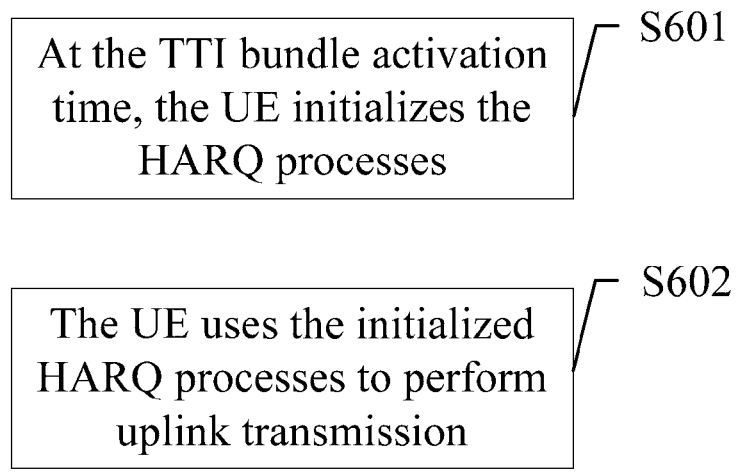
FIG. 6 is a flowchart of an uplink transmission method according to a sixth embodiment of the present invention.

As shown in FIG. 6, a flowchart of an uplink transmission method according to a sixth embodiment of the present invention is shown therein. The method according to the sixth embodiment includes the following steps.

S601: The UE initializes the HARQ processes at the TTI bundle activation time.

S602: The UE uses the initialized HARQ processes to perform uplink transmission.

Further, at the TTI bundle cancellation time, the UE initializes the HARQ processes for the uplink transmission and uses the initialized HARQ processes to perform subsequent uplink transmission.

Figure 7:
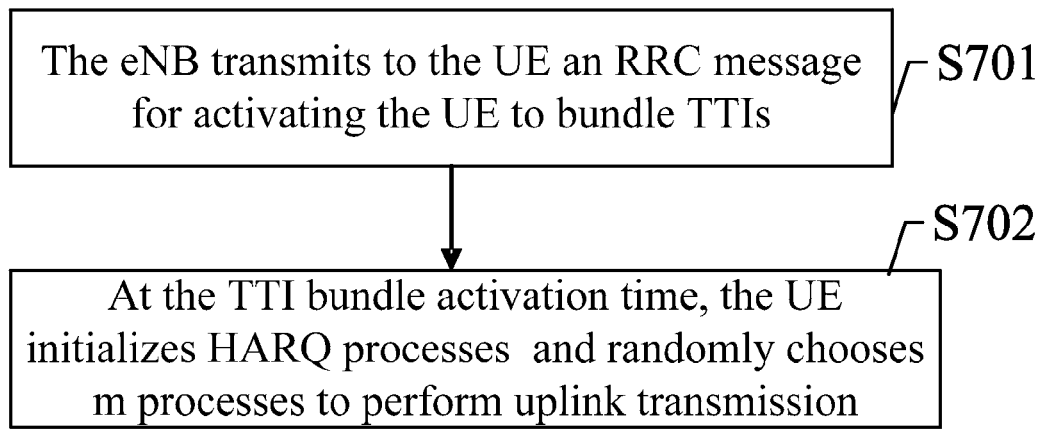
FIG. 7 is a flowchart of an uplink transmission method according to a seventh embodiment of the present invention.

As shown in FIG. 7, an uplink transmission method according to a seventh embodiment of the present invention is shown therein. The UE and the eNB use eight processes to perform HARQ transmission in the normal mode. Assume the TTI bundle activation time is time T1, and the TTI bundle size Bundle_size is 4. The method of this embodiment includes the following steps:

S701: The eNB transmits to the UE an RRC message for activating the UE to bundle TTIs. The message includes such configuration information as a TTI activation flag, a TTI bundle activation time and the like, and may further include static scheduling resource information configured for the UE. The TTI bundle activation time may be represented as a radio frame No. and a subframe No.

Correspondingly, the UE can learn when to activate the TTI bundling according to the received RRC message.

S702: At the TTI bundle activation time, the UE initializes all HARQ processes and randomly chooses m processes from these HARQ processes to perform uplink transmission.

The step of initializing the HARQ processes includes: flushing buffer of the HARQ processes; setting state variables of the HARQ processes to an initial state; and setting new data indicators (NDIs) corresponding to the HARQ processes to an initial value (i.e., an initial value 0 or 1 that is set according to a protocol).

Because in FDD mode of the LTE system, a round trip time (RTT) for uplink transmission in the normal mode has a value of 8, the RTT in the TTI bundling mode is 16. In order to increase the resource utilization rate, the value of m in this step may be 16÷4=4; i.e., the UE uses four initialized processes in the uplink transmission.

Specifically, before the time T1 during communication, there are eight processes in total for the UE and the eNB to use for HARQ transmission in the normal mode, and each process for the HARQ transmission corresponds to one millisecond (i.e., the length of one subframe) and the eight processes are used in turn in a period of eight milliseconds. From the time T1, there are four processes for the UE and the eNB to use for HARQ transmission in the TTI bundling mode during the uplink transmission, and each process for the HARQ transmission corresponds to four milliseconds (i.e., the length of four bundled subframes) and the four processes are used in turn in a period of sixteen milliseconds. The first transmission using the initialized HARQ processes will be considered as a new transmission, and it is unnecessary to compare the NDI value of the first transmission with the NDI value that is used before the TTI bundle activation time.

Optionally, when the uplink transmission between the UE and the eNB is switched from the TTI bundling mode to the normal mode (i.e., the TTI bundle is canceled), the UE may initialize the HARQ processes for uplink transmission or initialize all HARQ processes, and then perform the uplink transmission. The aforesaid step of initializing includes flushing buffer(s) of the HARQ processes, setting state variables to an initial state and setting the NDIs to an initial value. Assume that the TTI bundle cancellation time is time T2, then after the time T1 and before the time T2, the UE and the eNB use four processes to perform the uplink HARQ transmission. At the time T2, the UE and the eNB start to use eight processes to perform the uplink HARQ transmission, and the first transmission using the initialized HARQ processes will be considered as a new transmission which is not a retransmission of the previous transmission.

An alternative solution of the seventh embodiment is similar to the seventh embodiment except that: At the TTI bundle activation time, the UE initializes some (e.g. m) of the HARQ processes to perform the uplink transmission; and the UE in the TTI bundling mode does not initialize other HARQ processes used for uplink transmission.

For example, in FDD mode of the LTE system, the RTT for uplink transmission in the normal mode has a value of 8, the RTT in the TTI bundling mode is 16. In order to increase the resource utilization rate, the value of m in this step may be 16÷4=4; i.e., the UE initializes four HARQ processes and uses the four initialized HARQ processes to perform the uplink transmission in the TTI bundling mode.

Further, when the uplink transmission between the UE and the eNB is switched from the TTI bundling mode to the normal mode (i.e., the TTI bundling is canceled), the UE initializes all HARQ processes and then uses the initialized HARQ processes to perform the uplink transmission.

In the aforesaid seventh embodiment and the alternative solution thereof, after the TTI bundle activation time, the UE uses the initialized HARQ processes to perform the uplink transmission. This can avoid that the NDIs of the eNB and the UE are not synchronous and decrease potential errors during transmission and reception, thereby increasing the transmission quality.

Both the uplink transmission methods according to the sixth embodiment and the seventh embodiment of the present invention may be combined with the aforesaid first to fifth embodiments and alternative solutions thereof to further decrease the transmission error rate and increase the transmission quality and the resource utilization rate.

Figure 8:
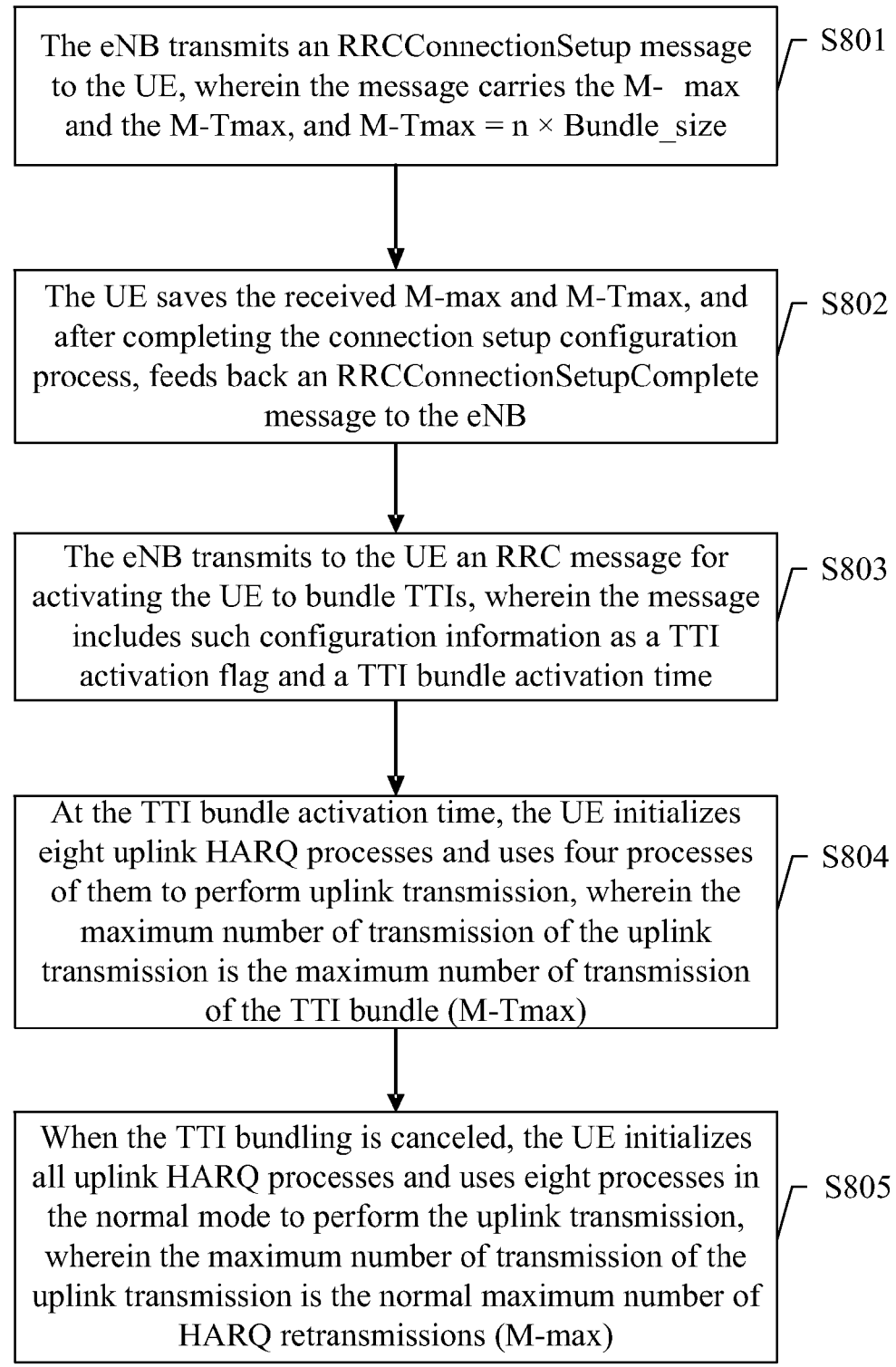
FIG. 8 is a flowchart of an uplink transmission method according to an eighth embodiment of the present invention.

In the following description, an uplink transmission scheme formed through combination of the seventh embodiment and the second embodiment will be described by taking an eighth embodiment as an example. As shown in FIG. 8, the method of the eighth embodiment includes the following steps:

S801-803: The steps S801-803 are similar to the steps S201-203 in the second embodiment, and thus will not be further described herein.

S804: At the TTI bundle activation time, the UE initializes all the eight uplink HARQ processes, and uses four processes of them to perform uplink transmission. The maximum number of transmission for the uplink transmission is the maximum number of transmission for the TTI bundling mode (M-Tmax).

For example, before the TTI bundle activation time, the UE and the eNB use M-Tmax=5 to perform HARQ transmission, there are eight processes in total for use in the HARQ transmission in the normal mode, and each process for the HARQ transmission corresponds to one millisecond (the length of one subframe). From the TTI bundle activation time, the UE and the eNB start to use M-Tmax=8 to perform the HARQ transmission during communication, there are four processes in total for use in the HARQ transmission in the TTI bundling mode, and each process for the HARQ transmission corresponds to four milliseconds (the length of four bundled subframes). The first transmission using the initialized HARQ processes will be considered as a new transmission, and it is unnecessary to compare the NDI value of the first transmission with the NDI value that is used before the TTI bundle activation time.

S805 (optional step): When the uplink transmission between the UE and the eNB is switched from the TTI bundling mode to the normal mode (i.e., the TTI bundling is canceled), the UE initializes all the uplink HARQ processes and then uses eight processes in the normal mode to perform the uplink transmission. The maximum number of transmission of the uplink transmission is the normal maximum number of transmission (M-max).

The aforesaid initialized processes may include flushing a buffer or buffers of the HARQ processes, setting state variables to an initial state, and setting the NDIs to an initial value.

For example, from the TTI bundle activation time to the TTI bundle cancellation time, the UE and the eNB use M-Tmax=8 to perform HARQ uplink transmission, there are four processes in total for use in the HARQ transmission in the TTI bundling mode, and each process for the HARQ transmission corresponds to four milliseconds (the length of four bundled subframes). From the TTI bundle cancellation time, the UE and the eNB start to use M-max=5 to perform the HARQ uplink transmission, there are eight processes in total for use in the HARQ transmission in the normal mode, and each process for the HARQ transmission corresponds to one millisecond (the length of one subframe). The first transmission using the initialized HARQ processes will be considered as a new transmission, and it is unnecessary to compare the NDI value of the first transmission with the NDI value that is used before the TTI bundle activation time.

In the aforesaid eighth embodiment, at the TTI bundle activation time, the UE uses the initialized HARQ processes to perform the uplink HARQ transmission with the eNB according to the maximum number of HARQ transmission for the TTI bundling mode. This can increase the communication quality and the utilization rate of channel resources and reduce potential resource conflicts.

Figure 9:
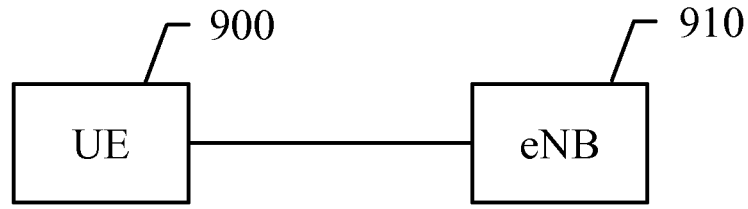
FIG. 9 is a schematic view of an uplink transmission system according to a ninth embodiment of the present invention.

As shown in FIG. 9, an uplink transmission system according to a ninth embodiment of the present invention is shown therein. The system includes a UE 900 and a base station eNB 910. The UE 900 is configured to acquire a maximum number of HARQ transmission (M-Tmax), and perform uplink transmission according to the M-Tmax after a TTI bundle activation time. The M-Tmax is an integral multiple of a TTI bundle size.

Figure 10:
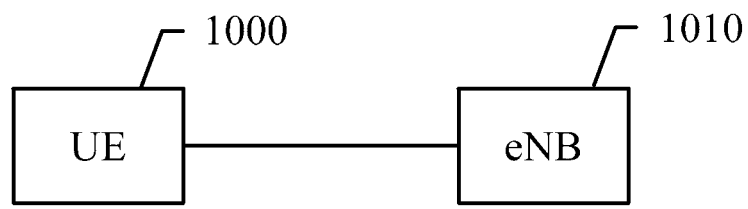
FIG. 10 is a schematic view of an uplink transmission system according to a tenth embodiment of the present invention.

As shown in FIG. 10, an uplink transmission system according to a tenth embodiment of the present invention is shown therein. The system includes a UE 1000 and an eNB 1010. The UE 1000 is configured to, initialize a HARQ process at a TTI bundle activation time, and perform uplink transmission using the initialized HARQ process.

Figure 11:
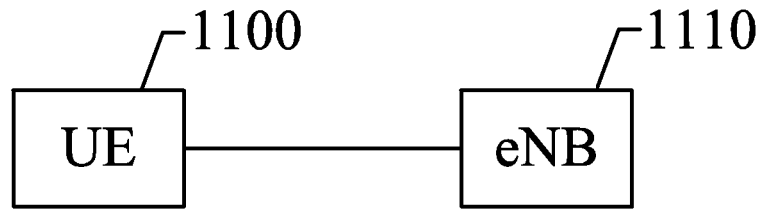
FIG. 11 is a schematic view of an uplink transmission system according to an eleventh embodiment of the present invention.

As shown in FIG. 11, an uplink transmission system according to an eleventh embodiment of the present invention is shown therein. The system includes a UE 1100 and an eNB 1110. The UE 1100 is configured to: acquire a maximum number of HARQ transmission (M-Tmax), wherein the M-Tmax is an integral multiple of a TTI bundle size; and initialize a HARQ process at a TTI bundle activation time, and perform uplink transmission using the initialized HARQ process, wherein the maximum number of HARQ transmission of the uplink transmission is the M-Tmax.

What described above are only preferred embodiments of the present invention. It shall be noted that, various alterations and modifications may be made by those of ordinary skill in the art without departing from the principle of the present invention, and all these alterations and modifications shall be also covered in the scope of the present invention.

What is claimed is:

1. An uplink transmission method, comprising:
   acquiring, by a user equipment (UE), a maximum number of hybrid automatic repeat request (HARQ) transmissions, wherein the maximum number of HARQ transmissions is an integral multiple of a transmission time interval (TTI) bundle size, wherein the integral multiple is greater than one; and
   performing, by the UE, uplink transmission according to the maximum number of HARQ transmissions after a TTI bundle activation time.

2. The method as claimed in claim 1, wherein acquiring the maximum number of HARQ transmissions comprises at least one of:
   acquiring the maximum number of HARQ transmissions carried by a radio resource control protocol (RRC) connection setup message;
   acquiring the maximum number of HARQ transmissions carried by an RRC connection reconfiguration message;
   acquiring the maximum number of HARQ transmissions carried by a TTI bundle activation message; and
   acquiring the maximum number of HARQ transmissions in a way appointed with an evolved node B (eNB).

3. The method as claimed in claim 2, wherein after the acquiring the maximum number of HARQ transmissions, the method further comprises saving the maximum number of HARQ transmissions by the UE.

4. The method as claimed in claim 1, wherein the maximum number of HARQ transmissions acquired by the UE is a preset maximum number of HARQ transmissions.

5. The method as claimed in claim 1, wherein performing uplink transmission comprises:
   initializing a HARQ process at the TTI bundle activation time; and
   performing uplink transmission according to the maximum number of HARQ transmissions using the initialized HARQ process.

6. The method as claimed in claim 5, wherein initializing the HARQ process comprises flushing a buffer of the HARQ process and setting a new data indicator to an initial value, the new data indicator indicating a new transmission or a retransmission.

7. The method as claimed in claim 1, wherein, after performing uplink transmission according to the maximum number of HARQ transmissions, the method further comprises:
   acquiring, by the UE, another maximum number of HARQ transmissions (M-max), at a TTI bundle cancellation time; and
   performing, by the UE, uplink transmission according to the M-max.

8. The method as claimed in claim 7, wherein performing uplink transmission according to the M-max comprises:
   initializing a HARQ process at the TTI bundle cancellation time; and
   performing uplink transmission according to the M-max using the initialized HARQ process.

9. The method as claimed in claim 8, wherein initializing the HARQ process comprises flushing a buffer of the HARQ process and setting a new data indicator to an initial value, the new data indicator indicating a new transmission or a retransmission.

10. A user equipment comprising a memory in communication with a processor, wherein the processor is configured to acquire a maximum number of hybrid automatic repeat request (HARQ) transmissions, and to perform uplink transmission according to the maximum number of HARQ transmissions after a TTI bundle activation time, wherein the maximum number of HARQ transmissions is an integral multiple of a transmission time interval (TTI) bundle size, wherein the integral multiple is greater than one.

11. The user equipment as claimed in claim 10, wherein the processor is further configured to:
   acquire the maximum number of HARQ transmissions carried by a radio resource control protocol (RRC) connection setup message; or
   acquire the maximum number of HARQ transmissions carried by an RRC connection reconfiguration message; or
   acquire the maximum number of HARQ transmissions carried by a TTI bundle activation message; or
   acquire the maximum number of HARQ transmissions in a way appointed with an evolved node B (eNB).

12. The user equipment as claimed in claim 11, wherein the processor is further configured to save the maximum number of HARQ transmissions.

13. The user equipment as claimed in claim 10, wherein the maximum number of HARQ transmissions acquired by the UE is a preset maximum number of HARQ transmissions.

14. The user equipment as claimed in claim 10, wherein the processor is further configured to initialize a HARQ process at the TTI bundle activation time, and to perform uplink transmission according to the maximum number of HARQ transmissions using the initialized HARQ process.

15. The user equipment as claimed in claim 14, wherein the processor is further configured to flush a buffer of the HARQ process and to set a new data indicator to an initial value, the new data indicator indicating a new transmission or a retransmission.

16. The user equipment as claimed in claim 10, wherein the processor is further configured to acquire another maximum number of HARQ transmissions (M-max) at a TTI bundle cancellation time, and to perform uplink transmission according to the M-max.

17. The user equipment as claimed in claim 16, wherein the processor is further configured to initialize a HARQ process at the TTI bundle cancellation time, and to perform uplink transmission according to the M-max using the initialized HARQ process.

18. The user equipment as claimed in claim 17, wherein the processor is further configured to flush a buffer of the HARQ process and to set a new data indicator to an initial value, the new data indicator indicating a new transmission or a retransmission.

19. A system comprising:
   a user equipment (UE); and
   a base station evolved node B (eNB);
   wherein the UE is configured to acquire a maximum number of hybrid automatic repeat request (HARQ) transmissions, wherein the maximum number of HARQ transmissions is an integral multiple of a transmission time interval (TTI) bundle size, wherein the integral multiple is greater than one; and to perform uplink transmission with the eNB according to the maximum number of HARQ transmissions after a TTI bundle activation time.

20. The system as claimed in claim 19, wherein:
   the UE is further configured to initialize a HARQ process at the TTI bundle activation time, and to perform uplink transmission with the eNB using the initialized HARQ process, wherein the maximum number of HARQ transmissions of the uplink transmission is the maximum number of HARQ transmissions.

* * * * *